United States Patent [19]
Fujii et al.

[11] 4,181,147
[45] Jan. 1, 1980

[54] SEALED TYPE HYDRAULIC RESERVOIR

[75] Inventors: Takashi Fujii, Toyota; Atsushi Ohmi, Anjo; Tomoyuki Nogami, Toyota; Takaaki Ohta, Okazaki, all of Japan

[73] Assignees: Aisin Seiki Kabushiki Kaisha, Kariya; Toyota Jidosha Kogyo Kabushiki Kaisha, Toyota, both of Japan

[21] Appl. No.: 848,562

[22] Filed: Nov. 4, 1977

[30] Foreign Application Priority Data

Nov. 5, 1976 [JP] Japan .................. 51-133524

[51] Int. Cl.² ................................. F15B 7/10
[52] U.S. Cl. ................... 137/572; 60/586; 60/592; 220/208; 220/209
[58] Field of Search ............... 60/534, 535, 545, 585, 60/586, 592; 137/513.5, 853, 859, 572, 574; 220/208, 209

[56]  References Cited
U.S. PATENT DOCUMENTS 2,622,762  12/1952  Parsons ..................... 220/209
3,196,617   7/1965  Ferrell .
3,256,117   6/1966  Howatt ..................... 220/209
3,423,939   1/1969  Lewis .
3,527,551   9/1970  Kutik ...................... 137/853

FOREIGN PATENT DOCUMENTS 2339279  2/1974  Fed. Rep. of Germany ........... 60/535
2555867  7/1976  Fed. Rep. of Germany ........... 60/535

Primary Examiner—Abraham Hershkovitz
Attorney, Agent, or Firm—Finnegan, Henderson, Farabow & Garrett

[57]  ABSTRACT

A sealed type hydraulic reservoir including a check valve for normally preventing communication between a sealed chamber in which brake fluid is stored and the surrounding atmospheric environment. The check valve allows atmospheric air to flow into the sealed chamber only when the pressure in the chamber drops below atmospheric level. A second check valve may be included for allowing air flow only out of the sealed chamber when the pressure in the chamber rises above atmospheric level.

9 Claims, 3 Drawing Figures

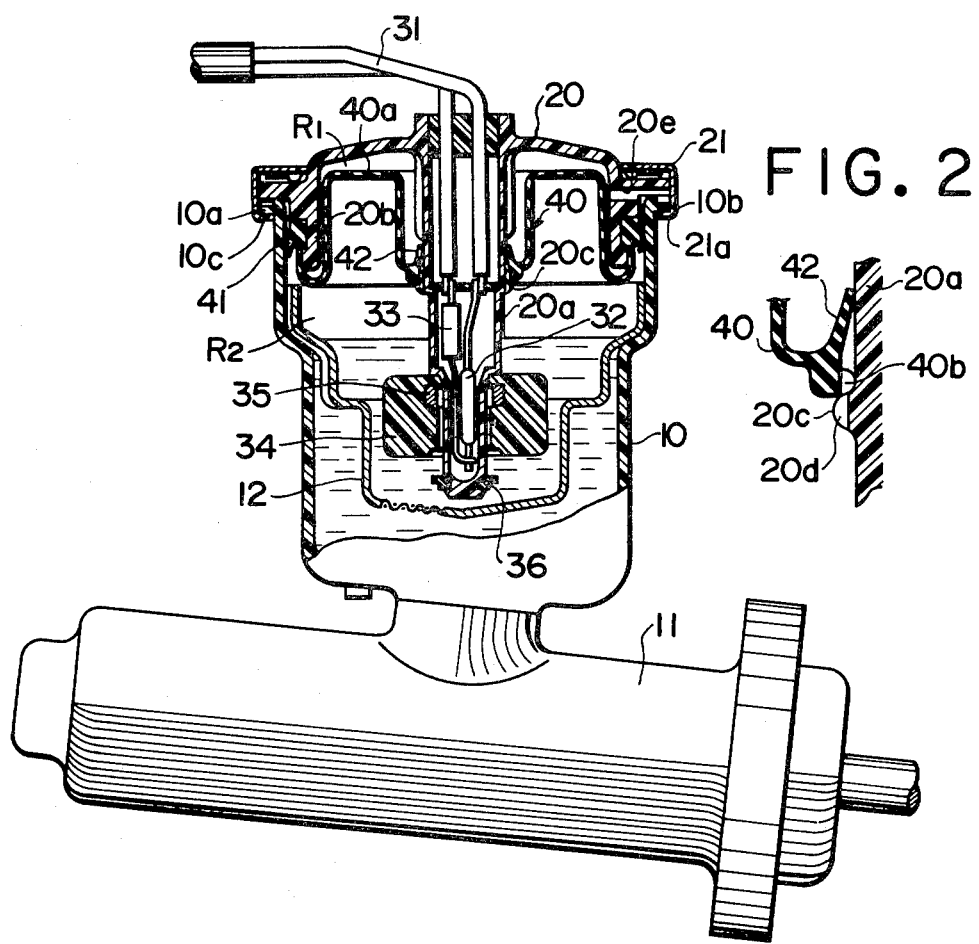

SEALED TYPE HYDRAULIC RESERVOIR

BACKGROUND OF THE INVENTION

1. Field of the Invention

This invention relates generally to a sealed type fluid reservoir, and more particularly to a sealed type hydraulic reservoir of a brake master cylinder for use in a vehicle brake system.

2. Description of Prior Art

Conventionally, in the sealed type fluid reservoir a diaphragm member or bellows has been utilized for preventing the entrance of air, water or dirt into the brake system from the reservoir and such a diaphragm member has also been utilized for maintaining the sealed chamber at substantial atmospheric level by the extendable movement thereof within the reservoir for decreasing or increasing the volume of the chamber in response to variations in liquid level in the chamber.

However, the extendable range of the diaphragm member is limited due to constructional reasons such as size or space limitations of the reservoir or provision of a level warning device within the reservoir.

Therefore, if the liquid level in the reservoir should be lowered beyond the extendable range of the diaphragm member, the pressure in the sealed chamber might drop below the atmospheric level (vacuum condition), which might occasion a dangerous situation in the braking system.

SUMMARY OF THE INVENTION

It is, therefore, an object of the present invention to provide an improved sealed type fluid reservoir for obviating the above conventional drawbacks.

It is a further object of the invention to provide an improved sealed type reservoir with check valve means which allows the air flow into the sealed chamber only when the pressure therein drops below the atmospheric level.

It is another object of the invention to provide an improved sealed type reservoir with a unique check valve means which comprises an annular sealing lip which is normally in sealed contact with the inside wall of the casing to prevent fluid communication from the reservoir, but is separated from the inside wall of the casing to allow air flow into the sealed chamber only when the pressure in the chamber drops below the atmospheric level.

It is still another object of the present invention to provide an improved sealed type fluid reservoir with check valve means compactly and inexpensively assembled.

BRIEF DESCRIPTION OF THE DRAWINGS

Further objects of the invention will become apparent from the description with reference to the attached drawings wherein;

FIG. 1 shows a vertical sectional view of the first embodiment of the invention;

FIG. 2 shows an enlarged partial view of FIG. 1; and

DETAILED DESCRIPTION OF THE INVENTION

Figure 3:
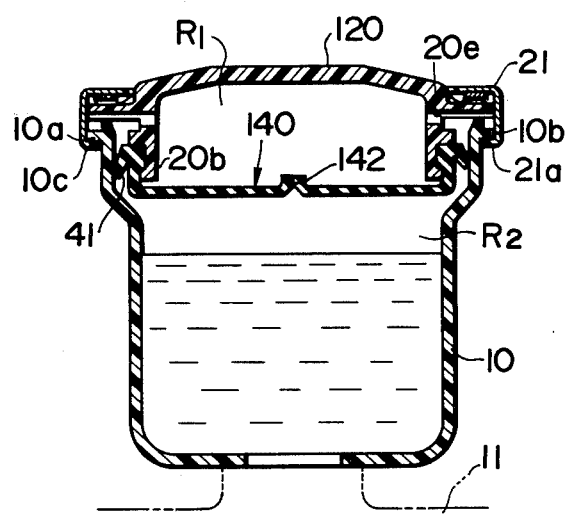
FIG. 3 shows a vertical sectional view of the second embodiment of the invention.

Referring now to the drawings, particularly to FIGS. 1 and 2, numeral 10 designates a casing of the reservoir which is fluid-tightly secured to a brake master cylinder 11. The casing 10 is made of transparent synthetic resin so that the fluid therein may be visible even from the outside of the casing. An oil strainer 12 is disposed within the casing 10 to supply strained fluid to the master cylinder 11. A cap member 20 is detachably mounted on the upper open end of the casing 10 by means of a clip 21. An annular flange 10a is provided at the outer periphery of the upper end of the casing 10. The flange 10a extends outwardly from the casing 10.

A vertical groove 10b is provided at an appropriate portion of the flange 10a for engageably receiving a pawl 21a provided at the clip 21. The flange 10a is provided with a cam surface 10c at the under side thereof for engaging with the pawl 21a of the clip 21.

The cap member 20 is made of synthetic resin and is provided with an inwardly extending stepped rod portion 20a at the central portion thereof. At the outer peripheral portion of the cap member 20 is provided an inwardly extending annular projection 20b in spaced relation with the inside wall of the casing 10.

The stepped rod portion 20a has a hollow cylindrical shape, and a reed switch 32 and a resistor 33 are disposed within the hollow interior of the rod portion 20a. The reed switch and the resistor 33 are connected to a fluid level warning indicator (not shown) through lead wires 31. A small diameter portion of the rod portion 20a is formed at the lower part thereof and slidably receives thereon a float member 34 which is movable along the outer periphery of the small diameter portion in a vertical direction. The downward movement of the float member 34 is limited by a stopper 36 secured to the lowermost part of the rod portion 20a. This float member 34 carries therein a ring shaped magnet 35 for actuating the reed switch 32.

A diaphragm member 40 is disposed in the casing 10 and the outer peripheral brim of the diaphragm is secured to the lower part of the annular projection 20b of the cap member 20. The diaphragm member 40 is made of a flexible thin rubber and has a plurality of corrugations 40a to enhance its flexibility. A first annular lip 41 is provided at the outer peripheral brim of the diaphragm member within the space between the inside wall of the casing 10 and the annular projection 20b of the cap member 20. The first annular lip 41 extends outwardly in a downward direction and the outward end thereof is in sealing engagement with the inside wall of the casing 10. The first annular lip 41 serves as a first check valve in cooperation with the inside wall of the casing 10. This check valve allows the air flow from the upper side to the lower side of the lip 41, but prevents the air flow from the lower to the upper side of the lip 41. A second annular lip 42 is provided at the inner periphery of the diaphragm member 40 as is clearly shown in FIG. 2. This lip 42 extends inwardly in an upward direction. The inward end of the lip 42 is in sealed contact with the outer periphery of the large diameter part of the stepped rod portion 20a of the cap member 20. The second annular lip 42 serves as a second check valve in cooperation with the outer periphery of the rod portion 20a thereby allowing the air flow from the lower side to the upper side of the diaphragm 40 but preventing the air flow from the upper side thereof. The lip 42 is prevented from downward movement by an annular stopper 20c formed integral with the stepped rod portion 20a of the cap member 20.

The first and second annular lips 41, 42 are formed integral with the diaphragm member 40.

Within the casing 10, an upper chamber $R_1$ is defined by the diaphragm member 40 between the under surface of the cap member and the upper surface of the diaphragm 40. The upper chamber $R_1$ is in communication with the atmosphere through vent hole 20e provided at the side wall of the cap member 20. Further, a lower chamber $R_2$ is defined by the diaphragm member 40 between the under surface of the diaphragm and the liquid surface of the brake fluid in the casing. Normally the two chambers $R_1$ and $R_2$ are fluidically separated from each other by the diaphragm member 40 including the two sealing lips 41 and 42. However, when the pressure in the lower chamber $R_2$ rises above the atmospheric pressure level, the second annular lip 42 will bend outwardly to be separated from the rod portion 20a thereby to allow air flow from the lower chamber $R_2$ to the upper chamber $R_1$ venting the lower chamber $R_2$ to atmosphere; the excess air in the lower chamber $R_2$ flows from the chamber $R_2$ through the recessed portion 20d on the annular stopper 20c and recessed portion 40b on the base of the lip 42 to the upper chamber $R_2$. On the other hand, when the pressure in the lower chamber $R_2$ drops below the atmospheric pressure level (vacuum condition), then the first annular lip 41 will bend inwardly to be separated from the inside wall of the casing 10 thereby to allow air flow from the upper chamber $R_1$ to the lower chamber $R_2$. In both cases when the pressure in the lower chamber $R_2$ returns to the atmospheric level, the respective lip 41, 42 will return to their original sealed positions by self-returning force or elastic force thereof.

The operation of the first embodiment will be explained hereinafter in detail:

First, when the liquid level of the brake fluid is unchanged, the entrance of water, dirt or air into the lower chamber $R_2$ is prevented, due to the sealed contacts between the first annular lip 41 and the inside wall of the casing 10 and between the second annular lip 42 and the outer periphery of the stepped rod portion 20a.

When the brake operation is normally performed and variations in liquid level in the reservoir are within the movable range of the diaphragm member 40, then the diaphragm member 40 is extendably deformed in response to variations in liquid level so as to maintain the pressure in the lower chamber $R_2$ at substantial atmospheric level.

Next, when the liquid temperature is so increased by the influence of the environmental temperature that the liquid in the casing may expand to raise the level thereof over the movable range of the diaphragm member 40, the pressure in the lower chamber $R_2$ will be increased due to the excess liquid level rise (i.e., due to the extreme decrease in volume of the chamber $R_2$). In this case, the second annular lip 42 is bent outwardly by the pressure difference between the two chambers $R_1$ and $R_2$, thereby allowing the air flow from the lower chamber $R_2$ to the upper chamber $R_1$ through recesses 20d and 40b. This valve operation is momentary and thereafter the lip 42 will again come in sealed contact with the stepped rod portion 20a by self-returning force for sealing the lower chamber $R_2$. During this operation, the first annular lip 41 maintains its sealed contact with the inside wall of the casing 10.

When the liquid level in the casing 10 drops over the extendable or movable range of the diaphragm because of liquid contraction or the excessive supply of liquid with the master cylinder 11, the lower chamber $R_2$ will also be in vacuum condition due to the lowering of the said liquid level. In this case the first annular lip 41 is bent inwardly to establish communication between the upper and lower chambers $R_1$ and $R_2$ through the space between the lip 41 and the inside wall of the casing 10 thereby to recover the pressure in the lower chamber $R_2$ to the level of the atmospheric pressure. This valve operation is also momentary and thereafter the first annular lip 41 will be in sealed contact with the inside wall of the casing 10 to interrupt again fluid communication between the two chambers $R_1$ and $R_2$. During this operation the second annular lip 42 maintains its sealed contact with the outer periphery of the stepped rod portion 20a.

When the liquid level in the casing 10 is exceedingly reduced due to leakage in the hydraulic brake circuit, the float member 34 is moved downward along the stepped rod portion 20a in response to level reduction and the magnet 35 of the float member 34 actuates the reed switch 32 to inform the driver of the vehicle of the occurrence of the emergency by the level warning indicator.

When the driver of the vehicle wishes to supply the brake fluid to the reservoir, he first disengages the pawl 21a of the clip 21 from the flange 10a of the casing 10 and then detaches the cap member 20 from the open end of the casing 10. During the cap detaching, the first annular lip 41 of the diaphragm member 40 is removed from the casing 10 by sliding along the inside wall of the casing 10. Therefore, the liquid attached to the inner surface of the lip 41 may not be attached to other elements or parts. After the liquid supply has been done and when the cap member 20 is being attached to the casing 10, the first annular lip 41 is slidably disposed in the casing 10 in such a manner that the liquid stuck to or attached to the inside wall of the casing 10 is forced downward into the casing 10. Therefore not one drop of liquid will fall out of the casing 10.

In FIG. 3, another embodiment of the invention, which removes the level warning device from the casing, is shown. Accordingly, a cap member 120 is not provided with the stepped rod portion of the previous embodiment. Further, diaphragm member 140 secured to the cap member 120 is formed in a plain thin plate shape and is provided with a valve bore 142 at the center thereof which is normally closed by the elasticity but is open when the pressure in the lower chamber $R_2$ increases over a predetermined value. A well known check valve construction such as disclosed in Japanese Patent Publication No. 47-23630 is provided integral with the diaphragm member 140 for cooperation with the valve bore 142. This check valve construction corresponds to the second check valve of the previous embodiment. Other elements of this embodiment are substantially the same as those of the previous embodiment, and therefore, explanation thereof may be omitted, only assigning the same numerals to the same elememts.

In this embodiment, when the liquid level rises due to an increase in pressure in the lower chamber $R_2$, then the valve bore 142 will open in cooperation with the check valve construction to establish fluid communication between the two chambers $R_1$ and $R_2$. Other operations and merits are substantially the same as the previous embodiment and therefore the explanation has been omitted.

As described, this invention has a unique construction characterized by the combination of the annular projection 20b provided on the cap member 20 or 120 in spaced relation with the inside wall of the casing 10 and the first annular lip 41 provided on the outer periphery of the diaphragm member 40 or 140 secured to the annular projection 20b, the first annular lip 41 being in sealed contact with the inside wall of the casing and deformable inwardly. Further, since the first annular lip 41 may be deformable only in inward direction, liquid attached to the inner surface of the lip 41 will not flow out or drip out of the casing during the operation of attaching or detaching the cap.

Although this invention has been described in connection with specific embodiments, numerous other adaptations will become apparent to those skilled in the art from the description in conjunction with the accompanying claims whereby the same or substantially the same results may be obtained.

What is claimed is:

1. A sealed type hydraulic reservoir comprising:
    a casing having an upper open end for storing brake fluid therein to be supplied to a hydraulic brake master cylinder;
    a cap member detachably mounted on the upper open end of said casing;
    an elastic seal member, said seal member being movable in response to variations in atmospheric pressure within said casing between upper and lower predetermined positions, the outer peripheral brim thereof being secured to said cap member for sealing the brake fluid stored in said casing;
    a first chamber within said reservoir and defined between the under side of said cap member and the upper side of said seal member, said first chamber being in communication with the atmosphere through a vent hole provided in said cap member;
    a second chamber within said reservoir and defined between the under side of said seal member and the liquid surface of said brake fluid, said second chamber being normally sealed by said seal member to maintain the pressure therein at the atmospheric level; and
    a first check valve means including a first annular lip formed at the outer peripheral brim of said seal member between said first and second chambers, said first annular lip being normally in sealed contact with the inside side wall of said casing for allowing air flow only from said first chamber to said second chamber when the pressure in the second chamber drops below atmospheric level and said seal member moves to said lower predetermined position, the sidewall of said cap member being spaced from the inside wall of said casing to define an annular space between said walls, said first check valve means being disposed in said annular space.

2. A sealed type hydraulic reservoir according to claim 1, wherein said first annular lip of said first check valve means is formed integral with said elastic seal member and is secured to an annular projection provided on said cap member, said annular projection of said cap member being extended downward within said first chamber in spaced relation with the inside wall of said casing.

3. A sealed type hydraulic reservoir according to claim 2, wherein said first annular lip is disposed in the space between said annular projection of said cap member and the inside wall of said casing and is secured to the former at the base portion thereof, the free end of said first annular lip being in sealed engagement with the inside wall of said casing by the elastic force thereof and being inwardly deformable.

4. A sealed type hydraulic reservoir according to claim 3, wherein the free end of said lip extends outwardly in a downward direction to be in sealed contact with the inside wall of said casing.

5. A sealed type hydraulic reservoir according to claim 1, also including a second check valve means at the central portion of said seal member, said second check valve means for allowing air flow only from said second chamber to said first chamber when the pressure in said second chamber rises above the atmospheric level, and said seal member moves to said upper predetermined position.

6. A sealed type hydraulic reservoir according to claim 1, wherein said elastic seal member is a diaphragm vertically movable in response to the variations in the liquid level in said casing.

7. A sealed type hydraulic reservoir comprising:
    a casing having an open upper end for storing brake fluid therein to be supplied to a hydraulic brake master cylinder;
    a cap member detachably mounted on the upper open end of said casing;
    an elastic seal member, said seal member being movable in response to variations in atmospheric pressure within said casing between upper and lower predetermined positions, the outer peripheral brim thereof being secured to said cap member for sealing the brake fluid stored in said casing;
    a first chamber within said reservoir and defined between the under side of said cap member and the upper side of said seal member, said first chamber being in communication with the atmosphere through a vent hole provided in said cap member;
    a second chamber within said reservoir and defined between the under side of said seal member and the liquid surface of said brake fluid, said second chamber being normally sealed by said seal member to maintain the pressure therein at the atmospheric level;
    a first check valve means including a first annular lip formed at the outer peripheral brim of said seal member between said first and second chambers, said first annular lip being normally in sealed contact with the inside wall of said casing for allowing air flow only from said first chamber to said second chamber when the pressure in the second chamber drops below the atmospheric level and said seal member moves to said lower predetermined position; and
    a second check valve means at the central portion of said seal member, said second check valve means for allowing air flow only from said second chamber to said first chamber when the pressure in said second chamber rises above the atmospheric level and said seal member moves to said upper predetermined position, said second check valve means including a second annular lip formed integral with said seal member, and said cap member including a rod portion extending downwardly from the under side thereof, said second annular lip being normally in sealed engagement with an outer periphery of said rod portion.

8. A sealed type hydraulic reservoir according to claim 7, wherein said second annular lip is supported on said rod portion of said cap member at the base portion thereof, the free end of said second annular lip extending inwardly in an upper direction thereby to be in sealed contact with said outer periphery of said rod portion.

9. A sealed type hydraulic reservoir according to claim 8, wherein said free end of said second annular lip is outwardly deformable about the base portion thereof.

* * * * *